United States Patent Office 3,558,701
Patented Jan. 26, 1971

1

3,558,701
4'-CHLORO-2-PHENOXY-2-METHYL-N,N-BIS-
(β-HYDROXYETHYL)PROPIONAMIDE
Joseph Nordmann, Paris, and Henri Blaise Swierkot,
Bondy, France, assignors to Ugine Kuhlmann, Paris,
France
No Drawing. Filed Nov. 29, 1968, Ser. No. 780,178
Claims priority, application France, Dec. 1, 1967,
130,567
Int. Cl. C07c 103/33
U.S. Cl. 260—559                                    1 Claim

ABSTRACT OF THE DISCLOSURE

4'-chloro-2-phenoxy - 2 - methyl-N,N-bis-(β-hydroxyethyl)-propionamide of the formula

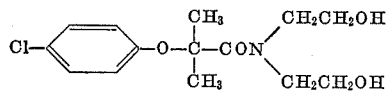

and the esters of this compound. The propionamide and its esters are useful for the treatment of hepatic disorders in human beings.

The present invention relates to a new medicament with a choleretic action comprising 4'-chloro-2-phenoxy-2-methyl-N,N-bis(β-hydroxyethyl) - propionamide which may be represented by the formula:

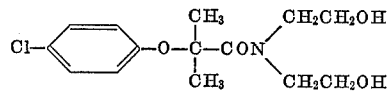

or an ester of this compound.

PREPARATION OF 4'-CHLORO - 2 - PHENOXY-2-METHYL - N,N' - BIS(β-HYDROXYETHYL)PROPIONAMIDE

This product may be prepared, for example, by condensing a halide of parachlorophenoxy-isobutyric acid with diethanolamine. An example of such a preparation, in which the parts are parts by weight unless the contrary is indicated, is given below:

350 parts by volume of dry acetone and 63.1 parts of diethanolamine are introduced into an apparatus provided with a stirring device, and then 69.0 parts of distilled parachlorophenoxy-isobutyryl chloride dissolved in 350 parts of acetone, and previously prepared from parachloro-phenoxy-isobutyric acid, are progressively added. The temperature of the reaction mixture is maintained at 15–25° C. by cooling. After the addition of the acid chloride, stirring is continued at the ambient temperature for about 3 hours. The acetone phase is separated by decantation and concentrated under a vacuum of 50 mm. of mercury at 40° C. The oily residue is taken up in 500 parts of water while stirring. At the end of a few moments, the oil crystallizes, and the crystals are filtered off and washed with water until the washings are neutral. The technical product (88 parts) is recrystallized from boiling water, using 77 parts of water to one part of technical 4'-chloro-2-phenoxy - 2 - methyl-N,N-bis-(β-hydroxyethyl)-propionamide. The melting point of the pure product is 95–97° C. taken in the capillary tube of a Culatti block.

Analysis.—Calculated for $C_{14}H_{20}ClNO_4$ (percent): C, 55.72; H, 6.68; N, 4.64. Found (percent): C, 55.82; H, 6.95; N, 4.48.

The esters of this compound may be prepared for example by general esterification methods.

TOXICOLOGICAL PROPERTIES

4'-chloro-2-phenoxy - 2 - methyl-N,N-bis-(β-hydroxymethyl)-propionamide is a compound of little toxicity; its lethal dose 50 taken orally by Swiss albino mice, is 2,300 mg. per kg. of the weight of the animal.

PHARMACOLOGICAL PROPERTIES

The pharmacological action of this compound has been studied on choleresis of the rat. The technique used consisted in determining, on the previously anaesthetised rat, the percentage increase of basis choleresis after administration of the products to be studied.

Female Sprague Dawley rats were used which were kept without food for sixteen hours before the test and divided into groups of 5 animals. After anaesthetising with an intraperitoneal dose of 1 g. of urethane per kg. of animal weight, and exploratory laparotomy, the choledoch was catheterised with a fine cannula of polyethylene of which the free end dipped into a 10 ml. cylinder graduated to 1/10°. The choleresis was noted every 30 minutes during control observation period of 2 hours (Period A), then the products to be studied were administered at the rate of one dose per group of 5 rats and 2 to 3 doses per product. Then the quantity of bile excreted was measured every 30 minutes during the two first hours (Period B), and the two following hours (Period C).

By the treatment of a group of five animals the percentage increase or reduction of the average choloreses B and C were established in comparison with the average choleresis for control A. The activity of the product on the choleresis of the rat is expressed by the percentage of variation (+ for a choleretic activity and − for a reduction of the choleresis) of the average quantity of bile excreted, on the one hand, during the two hours following its administration (period B) on the other hand, during the two subsequent hours (period C) compared with the average quantity excreted during the two hours in the control experiment (period A). These variations of the discharge of bile compared with the period A are expressed by the following formulae:

Period B: variation of the discharge of
bile in percent $= \dfrac{B-A}{A} \times 100$ Period C: variation of the discharge of
bile in percent $= \dfrac{C-A}{A} \times 100$ At the end of each observation period, the bile of the rats of each treatment group is mixed and the strength of the dry extract of the average samples of bile thus obtained are determined. For each observation period, the variation in the strengths of dry extract and the total amounts of biliary dry extract of the animals treated compared with the controls is calculated.

Under these conditions the following results were obtained.

ACTIVITY WITH RESPECT TO CHOLERESIS OF THE RAT

| Product | Dose mg./kg. per os or ml./kg. per os | Choleretic activity [1] | | DA50 mg./kg. | |
|---|---|---|---|---|---|
| | | Period B | Period C | Period B | Period C |
| Water (control) ml | 5 | 0 | 0 | | |
| Product according to the invention, mg | 50 | 17 | 15 | About 115 | About 270 |
| | 150 | 37 | 13 | | |
| | 450 | 61 | 24 | | |

[1] Variation of the average biliary flow with respect to the period A in percent.

In this technique, the DA50 B or C of a product is the dose of this product which, during the corresponding observation period, increases by at least 30% the choleresis of 50% of the rats as compared with their average choleresis during the control period A.

ACTIVITY WITH RESPECT TO THE CONTENT OF BILE IN THE DRY EXTRACT AND WITH RESPECT TO THE TOTAL QUANTITY OF DRY EXTRACT OF THE BILE OBTAINED DURING EACH OBSERVATION PERIOD.

| Product | Dose mg./kg. or ml./kg. | Dry extract of bile in percent | | | Variation of the level of dry extract compared to the control in percent | | | Variation of the quantity of dry extract compared with the control in percent | | |
|---|---|---|---|---|---|---|---|---|---|---|
| | | Periods | | | Periods | | | Periods | | |
| | | A | B | C | A | B | C | A | B | C |
| Water (control) ml | 5 | 3.42 | 2.86 | 2.615 | | | | | | |
| Product according to invention mg | 50 | 3.53 | 2.84 | 2.38 | +3 | 0 | −9 | +14 | +26 | +38 |
| | 150 | 3.27 | 2.69 | 2.27 | −4 | −6 | −13 | +7 | +46 | +31 |
| | 450 | 3.49 | 2.70 | 2.28 | +2 | −15 | −13 | +8 | +70 | +44 |

An examination of these tables shows the excellent choleretic activity of the product of the invention. This activity is accompanied by a considerable increase in the total quantity of dry extract of excreted bile as compared with the control.

The pharmacological activity of the compound has also been studied on the experimental atheroma of the rabbit (animals subjected for 14 weeks to a hypercholesterolemia diet). Under these conditions, the compound administered orally at a dose of 400 mg./kg./day lowered by about 22% the intensity of the aortic attack compared with that of the control-cholestrol.

Finally, the product has been tested from the viewpoint of certain actions on the control nervous system. In the test known as "traction" carried out on mice according to S. Courvoisier (Quart. Rev. Psychol. Neurol., 1956, 17, 25), the product is found to be active, its active dose 50, taken orally, being 250 mg./kg. of weight of the animal. In the supramaximal electric shock test carried out on mice according to the method of Swinyard et al. (J. Pharmacol., 1952, 106, 319) its active dose 50, taken orally, is 314 mg./kg. of the animal.

The results obtained taken as a whole enable 4'-chloro-2-phenoxy-2-methyl-N,N - bis - (β-hydroxyethyl)propionamide to be characterized as an excellent choleretic endowed with a certain anti-antheromatous activity and a sedative action.

THERAPEUTIC APPLICATIONS

In human therapeutics, the compound according to the invention may be administered at doses of 0.20 to 2 g. with a pharmaceutically acceptable carrier in the form of pills, lozenges, cachets, capsules or in the form of ampoules which can be ingested or injected parenterally or in the form of suppositories. Among the principal indications of use may be mentioned for example jaundice, biliary dyskinesia, cholecystitis and angiocholitis.

We claim:
1. 4'-chloro-2-phenoxy-2-methyl - N,N-bis-(β-hydroxyethyl)-propionamide of the formula:

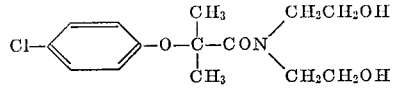

References Cited

UNITED STATES PATENTS 3,392,194  10/1968  Waring _____ 260—559

HENRY R. JILES, Primary Examiner

H. I. MOATZ, Assistant Examiner

U.S. Cl. X.R.

424—324